Dec. 25, 1934.  W. DE BACK  1,985,242

SELF OPENING CLUTCH

Filed Dec. 19, 1932

Inventor

William de Back

By Lyon & Lyon

Attorneys

Patented Dec. 25, 1934

1,985,242

UNITED STATES PATENT OFFICE 1,985,242

SELF-OPENING CLUTCH

William de Back, San Jose, Calif., assignor to Food Machinery Corporation, San Jose, Calif., a corporation of Delaware Application December 19, 1932, Serial No. 647,891

11 Claims. (Cl. 192—56)

In a situation where mechanism is driven through a clutch, if the work being accomplished by the mechanism is such that the force exerted through the clutch would be insufficient to accomplish the work, the mechanism would stall and possibly cause breakage of parts, and in such situation it is desirable to employ a clutch which will operate in the regular way to transmit sufficient force to accomplish the usual functions of the mechanism being driven, but which will open automatically in case the resistance to the driving force becomes abnormally great. For example, the clutch may be employed to advantage as a driving clutch for a fruit pitter.

The general object of this invention is to provide a clutch of this type which will operate and remain closed in the normal operation of the machine, but which will automatically open if the resistance to the operation of the machine becomes too great or abnormally great.

A further object of this invention is to provide a simple construction for a clutch of this type which will operate automatically to hold the clutch open after it has been caused to open through the operation of the abnormally high resistance.

Further objects of the invention will appear hereinafter.

The invention consists in the novel parts and combinations of parts to be described hereinafter, all of which contribute to produce an efficient self-opening clutch.

A preferred embodiment of the invention is described in the following specifications, while the broad scope of the invention is pointed out in the appended claims.

Figure 1:
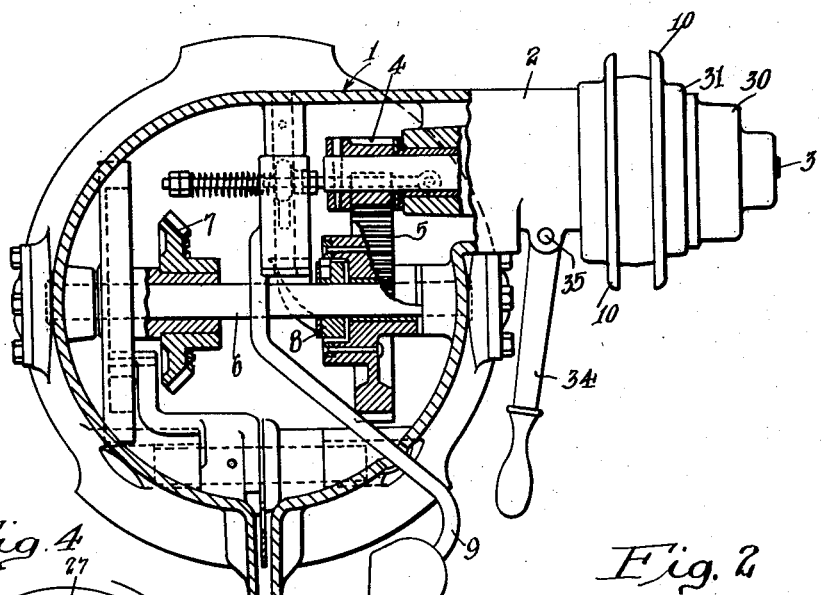
Figure 1 is a horizontal section through the lower part of a fruit pitting machine, certain parts being broken away and showing the clutch of my invention in plan.
Figure 4:
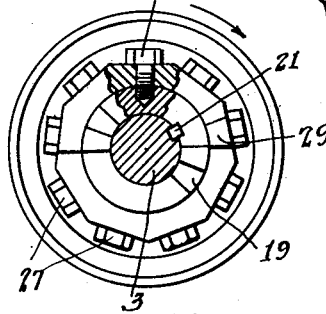
Figure 4 is a view showing the clutch shaft in section and showing the driven clutch member and parts associated with it, certain parts being broken away and shown in cross section.

Before proceeding to a more detailed description of the clutch, it should be stated that the clutch involves the use of a member which transmits the driving force to the driving clutch member and this member is so constructed that under the normal resistance of the mechanism driven through the clutch no distortion of this member will occur. However, if the resistance of the driven mechanism becomes abnormally high, this transmitting member will yield and through this yielding action of the transmitting member the opening of the clutch is automatically effected. When the clutch opens in this way it automatically holds itself in an open position until closed again by hand operation.

Referring more particularly to the parts, 1 indicates the frame of a fruit pitter which is in the form of a housing which may have an extension 2 at one side with bearings for the shaft 3 through which the mechanism of the machine is driven. This shaft is provided at a suitable point with a pinion 4 that meshes with a gear wheel 5 on a countershaft 6 suitably mounted in the frame or housing 1 and provided with a pinion 7 or other means for driving the machine. In the present instance, a one-revolution clutch 8 is provided which enables the fruit pitter to make a single revolution, and this clutch is controlled by a clutch lever 9.

Applying my invention to a machine of this type, I provide a driving member for the clutch which may be in the form of a belt pulley 10 which is mounted coaxially on the shaft 3 and preferably loose on this shaft. The shaft is mounted in suitable bearings 11 in the extension housing 2. The pulley is capable of shifting longitudinally on the shaft into two positions corresponding to the open position and the closed position of the clutch. This pulley carries the relatively movable clutch member of the clutch.

Figure 3:
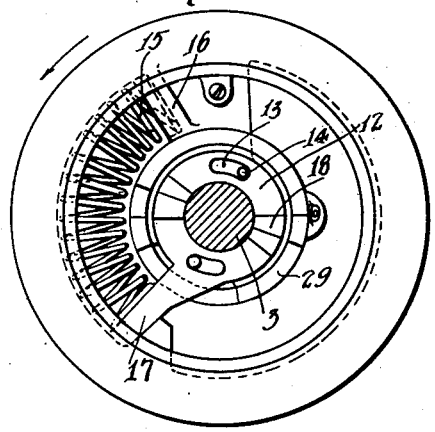
Figure 3 is a vertical section taken about on the line 3—3 of Figure 2, particularly illustrating the driving means through which the clutch is driven.

I provide a driving clutch member 12 which is preferably mounted on the pulley 10 so that it is capable of a limited circumferential movement on the pulley. This member 12 is preferably in the form of a plate with circumferential slots 13 receiving the corresponding pins 14 secured in the pulley. This driving clutch member 12 is driven from the pulley through a transmitting member which is capable of transmitting the normal necessary driving force for the machinery, without distortion, but which will yield if the resistance becomes abnormally great. For this purpose I prefer to employ the coil compression spring 15 which is disposed circumferentially within the pulley (see Fig. 3), the pulley being provided with a driving plate or lug 16 against which the rear end of the spring seats with respect to the direction of rotation of the pulley. The forward end of the spring thrusts against an arm 17 which extends out from the clutch member 12, the body of which is of substantially circular form.

The driving clutch member 12 is formed with clutch teeth or jaws 18, preferably two in number, which are disposed diametrically opposite to each other and which are capable of engaging with corresponding clutch jaws 19 formed on a driven clutch member 20. The clutch member 20 is in the form of a sleeve secured by a key 21 to the shafts 3. (See Fig. 2.)

Suitable means is provided for yieldingly holding the clutch in its open or closed position. This means is preferably associated with the shaft and comprises two circumferential slots 22 which cooperate with a pin 23 mounted radially in the pulley and backed up by a coil spring 24.

If the resistance of the machinery is abnormally great, the spring 15 will become compressed and thereby cause a slight relative movement between the clutch member 12 and the pulley. I provide means for utilizing this slight relative movement to effect the opening of the clutch, and this means preferably includes cam means associated with the clutch. In the present instance, I prefer to provide a cam 25 corresponding to the driving clutch member and a cam 26 corresponding to the driven clutch member 20. The cam 25 may be formed as an integral flange projecting out from the side of the pulley, while the cam 26 may be formed as a ring secured on the outside of the driven clutch member 20 by means of radially disposed studs 27. The cams 25 and 26 have complementary inclined cam faces 28 and 29, respectively, which, when in proper engagement, enable the driving jaws 18 and 19 of the clutch to engage with each other, but when a relative movement occurs of the clutch member 12 in a backward direction with respect to the direction of rotation of the clutch, cam faces 28 and 29 will cause the shifting of the cam member 25 toward the left. This will shift the pulley 10 to the left and will bring the pin 23 into line with the left hand groove 22. This will hold the clutch open automatically.

The clutch is preferably enclosed by a hood or clutch cover 30 that is pinned to the outer end of the shaft beyond the driven clutch member 20. The inner end of this cover may slide in and out with respect to a side flange 31 on the outer side of the driving pulley 10.

In order to close the clutch, the hub of the pulley 10 is provided with a slip-ring 32 which is engaged by a shifting yoke 33 operated by a lever 34 mounted to rock on a pin 35.

Figure 2:
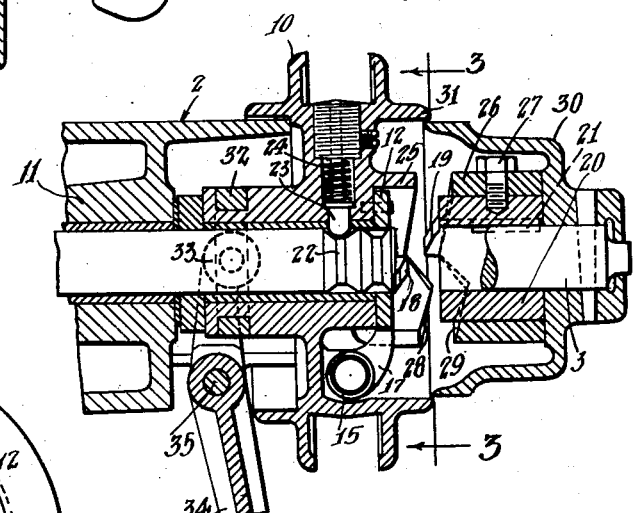
Figure 2 is a horizontal longitudinal section taken through the clutch mechanism about in the plane of the operating lever for the clutch illustrated in Figure 1.

In the operation of the clutch, the pulley 10 is located in a position toward the right of that illustrated in Figure 2, with the driving jaws 18 and 19 of the clutch members in engagement with each other. In this position the cams 25 and 26 are in proper alinement with each other to permit this engagement. The driving force from the pulley 10 is imparted through the spring 15 to the driving clutch member 12. This spring is constantly maintained in constraint by reason of the connection between the pulley and the driving clutch member. If the resistance to the machinery being driven through this clutch becomes abnormally great and sufficient to cause distortion of the spring 15 by compressing it further, a slight relative rotation of the clutch member 12 will take place in the backward direction with respect to the direction of drive. This would cause the cam faces 28 and 29 of the cams to shift the pulley 10 toward the left, whereupon the spring pressed pin 23 will come into line with the left hand groove 22 in the shaft and hold the clutch open until it is again closed by operating the hand lever 34.

It is understood that the embodiment of the invention described herein is only one of the many embodiments this invention may take, and I do not wish to be limited in the practice of the invention, nor in the claims, to the particular embodiment set forth.

What I claim is:

1. In a self-opening positive clutch, the combination of a driving clutch-member having a jaw with driving teeth, a driven clutch-member having a toothed jaw cooperating with the first named jaw, means including a coil spring mounted with its longitudinal axis extending circumferentially about the axis of the driving clutch member for imparting driving force to the driving clutch-member, a connection associated with the clutch-members and including cam means, said spring being unyielding in the normal driving of the clutch but operating to yield and cooperate with the cam means to permit the cam means to shift one of the clutch members and thereby disengage said jaws, and open the clutch when the resistance to the movement of the driven clutch-member becomes abnormally great.

2. In a self-opening positive clutch, the combination of a driving clutch-member having a toothed jaw, a driven clutch-member having a toothed jaw cooperating with the first named jaw, means including a coil spring mounted with its longitudinal axis extending circumferentially about the axis of the driving clutch member for imparting driving force to the driving clutch-member, a connection associated with the clutch-members and including cam means, said spring being unyielding in the normal driving of the clutch but operating to yield and cooperate with the cam means to permit the cam means to shift one of the clutch members and thereby disengage said jaws, and open the clutch when the resistance to the movement of the driven clutch-member becomes abnormally great, and means for limiting the expansion of the spring after the clutch has opened.

3. In a self-opening positive clutch, the combination of a shaft, a toothed driving clutch-member mounted to rotate on the axis of the shaft, a toothed driven clutch-member coaxial with the shaft, means including a coil spring mounted on the side of the driving clutch member for imparting a rotary driving force to the driving clutch-member, a cam associated with the driving clutch-member, a cam cooperating with the same and associated with the driven clutch-member, said spring being unyielding in the normal driving of said clutch but operating to yield and permit a relative movement of the cams when the resistance to the movement of the driven clutch member becomes abnormally great to open the clutch.

4. In a self-opening positive clutch, the combination of a rotary driving member, a circumferentially disposed cam formed thereon, a toothed driving clutch-member cooperating therewith, associated with the rotary driving member, means connecting the same permitting limited relative circumferential movement, a coil spring mounted on the side of the driving clutch member through which the driving force is imparted from the rotary driving member to the driving clutch-member, a driven clutch-member to cooperate with the driving clutch-member for effecting the drive through the clutch, a circumferentially disposed cam associated with the driving clutch-member, a circumferentially disposed cam associated with the driven clutch-member, said cams being complementary and operating, when engaged, to enable the said clutch-members to engage, said spring being unyielding in the normal driving of said clutch but operating to yield and permit a relative circumferential movement of the cams when resistance to the drive through the clutch becomes abnormally great, to open the clutch.

5. In a self-opening positive clutch, the combination of a rotary driving member, a circumferentially disposed cam formed thereon, a toothed driving clutch-member mounted on the rotary driving member for limited relative circumferential movement thereon, and a coil compression spring mounted with its longitudinal axis disposed circumferentially about the axis of the driving clutch member through which the driving force is imparted from the rotary driving member to the driving clutch-member, a driven clutch-member to cooperate with the driving clutch-member for effecting the drive through the clutch, a circumferentially disposed cam associated with the driving clutch-member, a circumferentially disposed cam associated with the driven clutch-member, said cams being complementary and operating when engaged, to enable the said clutch members to engage, said spring being unyielding in the normal driving of said clutch but operating to yield and permit a relative circumferential movement of the cams when resistance to the drive through the clutch becomes abnormally great, to open the clutch.

6. In a self-opening positive clutch, the combination of a rotary driving member, a circumferentially disposed cam carried thereby, a driving clutch-member, a connection between the driving member and the driving clutch-member permitting limited circumferential movement thereof, a coil spring mounted with its longitudinal axis extending circumferentially about the axis of the driving clutch member through which the driving force is imparted from the rotary driving member to the clutch-member, a relatively fixed driven clutch-member, a circumferentially disposed cam carried by the driving clutch-member, a circumferentially disposed cam on the driven clutch-member, said cams being complementary and operating when engaged to enable the said clutch-members to engage each other, said spring being unyielding in the normal driving of said clutch but operating to yield and permit a relative circumferential movement of the cams when resistance to the drive through the clutch becomes abnormally great and thereby enabling the cams to shift the relatively removable clutch-member to open the clutch.

7. In a self-opening clutch, the combination of a frame, a shaft mounted in the frame, a rotary driving member loosely mounted on the shaft and capable of shifting longitudinally on the shaft, a driving clutch-member mounted on the rotary driving member and capable of limited circumferential movement with respect to the same, a coil spring mounted on the side of the driving clutch member through which the driving force is imparted from the rotary driving member to the rotary driving clutch-member, said spring maintained in constraint when at rest, by reason of the said limited circumferential movement, a driven clutch-member rigid on the shaft to cooperate with the driving clutch-member for effecting the drive through the clutch, a circumferentially disposed cam rigid with the driving clutch-member, a circumferentially disposed cam rigid with the shaft, said cams being complementary and operating when engaged to enable the said clutch-members to engage each other, said spring being unyielding in the normal driving of said clutch but operating to yield and permit a relative circumferential movement of the cams when resistance to the drive through the clutch becomes abnormally great, thereby enabling the cams to shift the rotary driving member along the shaft and open the clutch.

8. In a self-opening clutch, the combination of a frame, a shaft mounted in the frame, a pulley loosely mounted on the shaft and capable of shifting longitudinally on the shaft, a driving clutch-member mounted on the pulley and capable of limited circumferential movement with respect to the same, a spring through which the driving force is imparted from the pulley to the rotary driving clutch-member, said spring maintained in distortion when at rest, by reason of said limited relative circumferential movement, a driven clutch-member rigid on the shaft to cooperate with the driving clutch-member for effecting the drive through the clutch, a circumferentially disposed cam rigid with the driving clutch-member, a circumferentially disposed cam rigid with the shaft, said cams being complementary and operating when engaged to enable the said clutch-members to engage each other, said spring being unyielding in the normal driving of said clutch but operating to yield and permit a relative circumferential movement of the cams when resistance to the drive through the clutch becomes abnormally great, thereby enabling the cams to shift the pulley along the shaft and open the clutch, and means associated with the shaft for holding the pulley in a position to hold the clutch closed and in a position to hold the clutch open.

9. In a self-opening positive clutch, the combination of a driving clutch-member, a rotary member for driving the driving clutch-member, a pin-and-slot connection between the same permitting limited relative circumferential movement, transmitting means mounted on the side of the driving clutch member between the driving member and the driving-clutch member for driving the latter, and capable of transmitting sufficient force for driving the clutch in the normal operation of the mechanism driven by the clutch, said transmitting means maintained in distortion by reason of said pin-and-slot connection, and operating to yield if the resistance to the drive is abnormally great, and means brought into action by the yielding of said transmitting means to open the clutch.

10. In a self-opening clutch, the combination of a frame, a shaft mounted in the frame, a rotary driving member loosely mounted on the shaft and capable of shifting longitudinally on the shaft, said driving member having a circumferential face and said shaft having circumferential grooves, yielding means carried in said rotary driving member and mounted in the same through the said circumferential face, for engaging either of the said grooves in the shaft to hold the rotary driving member in different positions with respect to the shaft, a driving clutch member mounted on the rotary driving member and capable of limited circumferential movement with respect to the same, a coil spring mounted on the side of the rotary driving member through which the driving force is imparted from the rotary driving member to the rotary driving clutch member, said spring maintained in constraint when at rest, by reason of the said limited circumferential movement, a driven clutch member rigid on the shaft to cooperate with the driving clutch member for effecting the drive through the clutch, a circumferentially disposed cam rigid with the driving clutch member, a circumferentially disposed cam rigid with the shaft, said cams being complementary and operating when engaged to enable the said clutch members to engage each other, said spring being unyielding in the normal driving of said clutch but operating to yield and permit a relative circumferential movement of the cams when resistance to the drive through the clutch becomes abnormally great, thereby enabling the cams to shift the rotary driving member along the shaft and open the clutch.

11. In a self-opening positive clutch, the combination of a driving clutch member having a toothed jaw, a driven clutch member having a toothed jaw cooperating with the first-named jaw, means including a coil spring mounted on the side of the driving clutch member with its axis disposed circumferentially with respect to the axis of the clutch member for imparting driving force to the driving clutch member, a connection associated with the clutch members and including cam means, said spring being unyielding in the normal driving of the clutch but operating to yield and cooperate with the cam means to permit the cam means to shift one of the clutch members and thereby disengage said jaws, and open the clutch when the resistance to the movement of the driven clutch member becomes abnormally great, and means for limiting the expansion of the spring after the clutch has opened.

WILLIAM DE BACK.